United States Patent
Wu et al.

[19]

[11] Patent Number: 6,123,752
[45] Date of Patent: Sep. 26, 2000

[54] HIGH EFFICIENCY SYNTHETIC FILTER MEDIUM

[75] Inventors: Tien Wu, Woodbury; Richard Kinderman, Lake Elmo; Seyed Angadjivand, Woodbury, all of Minn.

[73] Assignee: 3M Innovative Properties Company, St. Paul, Minn.

[21] Appl. No.: 09/146,627

[22] Filed: Sep. 3, 1998

[51] Int. Cl.$^7$ ...................................................... B03C 3/28
[52] U.S. Cl. .................................. 96/69; 55/524; 55/528; 55/DIG. 5; 55/DIG. 39; 264/DIG. 48; 442/88
[58] Field of Search .................................. 96/15, 69, 99, 96/17, 55, 66, 96, 97, 68; 442/88; 55/523–528, 487, DIG. 5, DIG. 39, DIG. 33, DIG. 35; 95/57, 78, 900; 307/400; 264/484, 436, 340, DIG. 8, DIG. 47, DIG. 48; 128/205.27, 205.29; 361/225, 233

[56] References Cited

U.S. PATENT DOCUMENTS

| | | | |
|---|---|---|---|
| 4,011,067 | 3/1977 | Carey, Jr. .................................... | 55/487 |
| 4,011,506 | 3/1977 | Bowden ............................... | 348/194 X |
| 4,375,718 | 3/1983 | Wadsworth et al. .................. | 55/DIG. 5 |
| 4,588,537 | 5/1986 | Klaase et al. ..................... | 264/DIG. 48 |
| 4,592,815 | 6/1986 | Nakao ................................ | 264/436 X |

(List continued on next page.)

FOREIGN PATENT DOCUMENTS

| | | |
|---|---|---|
| 3-59158 | 3/1991 | Japan . |
| WO 97/07272 | 2/1997 | WIPO . |

OTHER PUBLICATIONS

Lavergne et al.—"A Review of Thermo–Stimulated Current", IEEE Electrical Insulation Magazine, vol. 9, No. 2, 5–21, 1993.

Chen—"Analysis of Thermally Stimulated Processes", Pergamon Press, 1981.

Davies—The Separation of Airborne Dust and Particulates, Inst. Mech. Eng., London, Proceedings 1B, 1952.

"Electret HEPA Filter", INDA's American Filtration Society Joint Meeting, Mar. 1993.

"Toyobo Electret Air Filter; Elitolon", Toyobo Company on Apr. 1991.

Sessler—"Electrets", Springer–Verlag, 1987.

van Turnhout—"Thermally Stimulated Discharge of Polymer Electrets", Elsevier Scientific Publishing Co., 1975.

Van Wente—"Superfine Thermoplastic Fibers", Ind. Eng. Chem., vol. 48, pp 1342–46 (1956).

"$2^{nd}$ International Nonwovens Filtration Conference, New Technologies and Applications", Association of the Nonwoven Fabrics Industry, Mar. 22–24, 1993.

"Nonwovens in Filtration: A Growing Market", INDA's Filtration Conference, Mar. 12–14, 1991.

Primary Examiner—Richard L. Chiesa
Attorney, Agent, or Firm—Gary L. Griswold; Robert W. Sprague; William J. Bond

[57] ABSTRACT

A high efficiency filtration medium comprised of a nonwoven filter web of electret charged fibers of a nonconductive thermoplastic resin having a resistivity greater than $10^{14}$ ohm-cm, preferably polypropylene. The nonwoven filter web has a basis weight (BW) of less than 60 grams/m$^2$, an effective fiber diameter (EFD) of less than 5 microns and a penetration (PEN) of less than 0.03%, wherein the ratio);

BW/(EFD.PEN)

is greater than 200. The invention filter medium can be easily used in applications requiring HEPA performance at relatively low pressure drops.

28 Claims, 2 Drawing Sheets

U.S. PATENT DOCUMENTS

| | | | |
|---|---|---|---|
| 4,650,506 | 3/1987 | Barris et al. | 55/487 |
| 4,728,349 | 3/1988 | Oshitari | 55/487 |
| 4,749,348 | 6/1988 | Klaase et al. | 307/400 X |
| 4,820,135 | 4/1989 | Simmons | 417/391 |
| 4,824,451 | 4/1989 | Vogt et al. | 55/528 |
| 4,874,399 | 10/1989 | Reed et al. | 55/DIG. 39 |
| 4,874,659 | 10/1989 | Ando et al. | 428/221 |
| 5,017,197 | 5/1991 | McGuire et al. | 55/385.2 X |
| 5,057,710 | 10/1991 | Nishiura et al. | 307/400 |
| 5,069,691 | 12/1991 | Travis et al. | 55/356 X |
| 5,102,435 | 4/1992 | Rau et al. | 55/467 |
| 5,230,723 | 7/1993 | Travis et al. | 55/350 |
| 5,240,479 | 8/1993 | Bachinski | 55/DIG. 33 |
| 5,256,176 | 10/1993 | Matsuura et al. | 264/DIG. 8 |
| 5,273,565 | 12/1993 | Milligan et al. | 55/528 |
| 5,301,388 | 4/1994 | Zeren | 15/327.1 |
| 5,306,321 | 4/1994 | Osendorf | 55/487 |
| 5,401,446 | 3/1995 | Tsai et al. | 361/225 X |
| 5,411,576 | 5/1995 | Jones et al. | 95/57 |
| 5,427,597 | 6/1995 | Osendorf | 55/487 |
| 5,472,481 | 12/1995 | Jones et al. | 96/15 |
| 5,496,507 | 3/1996 | Angadjivand et al. | 55/528 X |
| 5,507,859 | 4/1996 | Kaiser | 95/273 |
| 5,582,907 | 12/1996 | Pall | 428/287 |
| 5,620,785 | 4/1997 | Watt et al. | 428/219 |
| 5,643,507 | 7/1997 | Berrigan et al. | 264/DIG. 48 |
| 5,645,627 | 7/1997 | Lifshutz et al. | 96/69 X |
| 5,667,562 | 9/1997 | Midkiff | 55/DIG. 39 |
| 5,726,107 | 3/1998 | Dahringer et al. | 442/414 |
| 5,792,242 | 8/1998 | Haskett | 55/DIG. 39 |
| 5,817,415 | 10/1998 | Chou et al. | 428/359 |
| 5,830,810 | 11/1998 | Cohen | 55/DIG. 39 |
| 5,834,386 | 11/1998 | Cohen | 55/DIG. 39 |
| 5,908,598 | 6/1999 | Rousseau et al. | 264/340 X |

HIGH EFFICIENCY SYNTHETIC FILTER MEDIUM

BACKGROUND AND FIELD OF THE INVENTION

The present invention relates to high efficiency particulate filter materials, particularly HEPA type synthetic fiber filtration medium.

High efficiency particulate air (HEPA) filtration medium is commonly used in environments that require very clean conditions such as surgical operating rooms or clean rooms. More recently, HEPA filtration has become popular in uses having less demanding criteria such as heating, ventilation and air conditioning systems (HVAC systems), respiratory filters, vacuum cleaners, room air cleaners and the like. Conventional HEPA filtration medium comprises an extremely fine diameter fiberglass medium, generally formed from glass fibers having mean diameters of less than 1 micron. Filtration efficiency of glass fiber HEPA medium generally increases as the mean fiber diameter decreases at the expense of a corresponding increase in pressure drop across the filter. Pressure drops for glass fiber filtering medium with HEPA-type performance generally is in the range of 25mm $H_2O$ or higher. Problems with this glass fiber filter medium include the aforementioned relatively high pressure drops, clogging due to surface loading of particles, and health concerns. In an attempt to address the pressure drop problems and other difficulties associated with fiberglass HEPA filtration medium, U.S. Pat. No. 4,824,451 proposes forming a near to HEPA performance type filter having efficiencies ranging from 95% to 99.26% at pressure drops of about 8mm $H_2O$, using meltblown microfiber webs having extremely small effective fiber diameters. Increased efficiencies were obtained by subsequently calendering the webs, such that efficiencies of up to 99.57% could be reached at pressure drops of from around 10mm to 20mm $H_2O$. Although the filter medium of this patent has lower pressure 5 drops than the fiberglass HEPA filter medium, the efficiency does not quite reach HEPA performance even at the relatively high basis weight of 2 oz/square yard (approximately 70 gm/$m^2$).

Extremely fine solution blown fibers are described in U.S. Pat. Nos. 4,011,506 and 4,650,506. As described in U.S. Pat. No. 4,650,506, these extremely fine solution blown fiber medium can be quite thin and have HEPA performance, however, lack sufficient strength, and as such are non-handleable and non-self supporting.

HEPA type filtration performance can also be obtained by simply increasing the basis weight or thickness of basically any filtration medium sufficiently. This approach is described in U.S. Pat. No. 5,240,479. This patent describes laminating four or more layers of blown microfiber filtration medium each having an effective fiber diameter of approximately 3.2 microns, a basis weight of 30 g/$m^2$, and a thickness of 0.009 inches. Each particular layer is indicated as being 88% efficient (against 0.3 micron particles at 10.5 feet/minute). By placing four(4) of these filtration media in successive layers, filtration efficiencies of HEPA type performance are alleged obtained. The reported filter medium had a pressure drop of approximately 0.4 inches $H_2O$ (10 mm $H_2O$), using over 120 g/$m^2$ of electret charged filter medium. This filter is generally quite thick and difficult to pleat into a high density pleated structure.

Others have also purported that HEPA type filtration performance can be obtained by charged meltblown microfiber webs. For example, the article "Electret HEPA Filter", presented at INDA's American Filtration Society Joint Meeting, March 1993, Philadelphia, Pa. describes 150 millimeter thick filter webs having pressure drops of from 12 to 12.5mm of water at an airflow rate of 17 $m^3$/minute and having HEPA type performance. These electret charged blown microfiber (BMF) filters outperform traditional glass HEPA filters in providing for lower pressure drops and longer useful lives, particularly when used with a pre-filter. However, these media are still quite thick and further improvements in the performance of these types of webs would be desirable. A similar HEPA type performance BMF web is also described in "Nonwovens in Filtration: A Growing Market", a paper presented at INDA's Filtration Conference, Mar. 12–14, 1991, Philadelphia, Pa., which paper describes a medium exhibiting HEPA performance having a basis weight of approximately 100 g/$m^2$, a thickness of 0.64mm, and a pressure drop of 8.5mm $H_2O$ at a face velocity of 1.5 m/min. A similar web is also described in "Toyobo Electret Air Filter; Elitolon", a paper published by the Toyobo Company of Osaka, Japan on April, 1991. These filtration medium, although providing HEPA type performance, do so at relatively high basis weights of 100 gm/$m^2$ or higher which filter webs are generally relatively thick and are more difficult to handle and form into complex pleated structures. There is significant desire to provide HEPA level performance filter medium at ever increasing efficiencies at lower pressure drops, lower basis weights and lower thickness ranges in a form which is easily pleatable and joinable to other functional layers.

SUMMARY OF THE INVENTION

The invention comprises a high efficiency filtration medium comprised a nonwoven filter web of electret charged fibers of a nonconductive thermoplastic resin having a resistivity greater than $10^{14}$ ohm-cm, preferably polypropylene. The nonwoven filter web has a basis weight (BW) of less than 60 grams/$m^2$, an effective fiber diameter (EFD) of less than 5 microns and a penetration (PEN) of less than 0.03%, wherein the ratio(I);

$$BW/(EFD \cdot PEN) \qquad\qquad I$$

is greater than 200.

The invention filter medium can be easily used in applications requiring HEPA performance at relatively low pressure drops, including clean rooms, operating rooms, HVAC systems air cleaners, vacuum cleaners, respirators, face-masks powered air purifiers and the like. The medium is further pleatable and can be heat bonded to other substrates.

DETAILED DESCRIPTION OF THE PREFERRED EMBODIMENTS

The filtration medium of the invention is a charged nonwoven fiber web, which fibers are formed of a generally nonconductive polymer and a charge performance-enhancing additive. The polymer can be a nonconductive thermoplastic resin, that is, a resin having a resistivity greater than $10^{14}$ ohm-cm, more preferably $10^{16}$ ohm-cm. The polymer should have the capability of possessing a non-transitory or long-lived trapped charge. The polymer can be a homopolymer, copolymer or polymer blend. The preferred polymers include polyolefins; such as polypropylene, poly(4-methyl-1-pentene) or linear low density polyethylene; polystyrene; polycarbonate and polyester. The major component of the polymer or polymer blend is preferably polypropylene because of polypropylene's high resistivity, ability to form melt-blown fibers with diameters useful for the invention air filtration medium, satisfactory charge stability, hydrophobicity and resistance to humidity.

Performance-enhancing additives, as defined in the present invention, are those additives that enhance the filtration performance of the electret filtration medium to HEPA level performance. Potential performance-enhancing additives include those described by Jones et al., U.S. Pat. No. 5,472,481 and Rousseau et al., WO 97/07272 (U.S. application Ser. No. 08/514,866), the substance of which are incorporated herein by reference in their entirety. The performance-enhancing additives include fluorochemical additives namely a thermally stable organic compound or oligomer containing at least one perfluorinated moiety, such as fluorochemical piperazines, stearate esters of perfluoroalcohols, and/or thermally stable organic triazine compounds or oligomers containing at least one nitrogen atom in addition to those of the triazine group. In view of their demonstrated efficacy in improving electret properties, the performance-enhancing additive is preferably a fluorochemical oxazolidinone. Preferably the fluorochemical has a melting point above the melting point of the polymer and below the extrusion temperature. For processing considerations, when using polypropylene, the fluorochemicals preferably have a melting point above 160° C. and more preferably a melting point of 160° C. to 290° C.. Preferred fluorochemical additives include Additives A, B and C of U.S. Pat. No. 5,411,576 having the respective structures, Preferred triazines include those having the following generic structure, where $R^2$ is an alkyl group, which may be straight chain or branched and preferably having 4 to 10 carbon atoms and n is a number from 2 to 40, preferably 2 to 20.

The polymer and performance-enhancing additive can be blended as solids before melting them, or melted separately and blended together as liquids. Alternatively, the additive and a portion of the polymer can be mixed as solids and melted to form a relatively additive-rich molten blend that is subsequently combined with the non-additive- containing polymer.

The performance enhancing additive is preferably a hindered or aromatic amine compound; most preferably a compound containing a hindered amine such as those derived from tetramethylpiperidine rings, where R is hydrogen or an alkyl group. Preferably the hindered amine is associated with a triazine group as described above. Alternatively, nitrogen or metal containing hindered phenol charge enhancers could be used such as disclosed in U.S. Pat. No. 5,057,710, the substance of which is incorporated by reference in its entirety.

The nonwoven filter web of the invention preferably contains about 0.2 to 10 weight percent of the performance-enhancing additive; more preferably about 0.2 to 5.0 weight percent; and most preferably about 0.5 to 2.0 weight percent, based on the weight of the article.

The molten blend is preferably extruded through a fiber die onto a collecting surface. The melt blend is extruded from the fiber die and formed into a web of thermoplastic microfibers. The microfibers are integrally bonded each to the other at their crossover points either during the web formation process or after the web formation process. Preferably the melt blend is extruded through offices in a die under melt-blowing conditions. Melt-blowing is known to offer numerous advantages, especially at producing fine diameter nonwoven fiber webs. The melt blown webs used to form the HEPA filter webs of the invention can be made using melt-blowing processes and apparatuses that are well known in the art. Fiber melt-blowing was initially described by Van Wente, "Superfine Thermoplastic Fibers," mnd. *Eng. Chem.*, vol. 48, pp. 1342–46, (1956).

In general, the melt-blowing process used to produce the present invention filter medium is conventional, however, the conditions are modified to produce fine fiber filter webs having effective fiber diameters (EFD's), as described in the examples, of less than 5 microns, preferably less than 4.5 microns, and most preferably less than 4 microns. The effective fiber diameter can be decreased by decreasing the collector to die distance, using a vacuum within a foraminous collector surface, lowering the polymer flow rate, or changing the air pressure, temperature or volume used to attenuate the melt streams exiting from the die. Also, the design of the die and attenuating air vanes can be varied such as changing the relative angle of the attenuating air, changing the distance between the die tip and the junction point of the attenuating air or changing the die orifice diameters and/or diameter-to-length ratios. These factors and others are discussed for example in WO 92/18677A (Bodaghi et al.). A preferred intermediate composition for making the invention electret filter web is made by blending and extruding a mixture of 90 to 99.8 weight percent organic polymer and 0.2 to 10 weight percent of a performance-enhancing additive; wherein the material is extruded through a die under meltblown conditions to form fibers that are collected as a nonwoven web. The fibers can be quenched, before being collected, by a cooling process such as water spraying, spraying with a volatile liquid, or contacting with chilled air or cryogenic gasses such as carbon dioxide or nitrogen.

Melt-blown fibers are collected as a nonwoven web on a rotating drum or moving belt. The collector to die distance is generally from 8 to 25 cm, preferably from 10 to 20 cm with the collector preferably being foraminous such that it can be used with a vacuum to remove excess air.

The collected web material can also be annealed to increase electrostatic charge stability in the presence of oily mists. Preferably, the annealing step is conducted at a sufficient temperature and for a sufficient time to cause the additive to diffuse to the interfaces (e.g., the polymer-air interface, and the boundary between crystalline and amorphous phases) of the material. Generally, higher annealing temperatures allow shorter annealing times. To obtain desirable properties for the final product, annealing of polypropylene materials should be conducted above about 100° C. Preferably, annealing is conducted from about 130 to 155° C. for about 2 to 20 minutes; more preferably from about 140 to 150° C. for about 2 to 10 minutes; and still more preferably about 150° C. for about 4.5 minutes. Annealing should be conducted under conditions that do not substantially degrade the structure of the web. For polypropylene webs, annealing temperatures substantially above about 155° C. may be undesirable because the material can be damaged.

The inventive method further includes the step of electrostatically charging the nonwoven web material before or after it has been collected. Examples of electrostatic charging methods useful in the invention include those described in U.S. Pat. Nos. 5,401,446 (Tsai, et al.), 4,375,718 (Wadsworth et al.), 4,588,537 (Klaase et al.), and 4,592,815 (Nakao). The electret materials may also be hydrocharged (see U.S. Pat. No. 5,496,507 to Angadjivand et al.). Preferably, the charging process involves subjecting the nonwoven web to hydrocharging as disclosed in U.S. Pat. No. 5,496,507. This charging method is advantageous in that it easily provides the required charging level to form a HEPA filter medium web of the invention in a process that can be continuous. Also this charging method can be performed on a preformed web thereby avoiding the difficulties in forming charged fibers into a uniform web structure.

Figure 1:
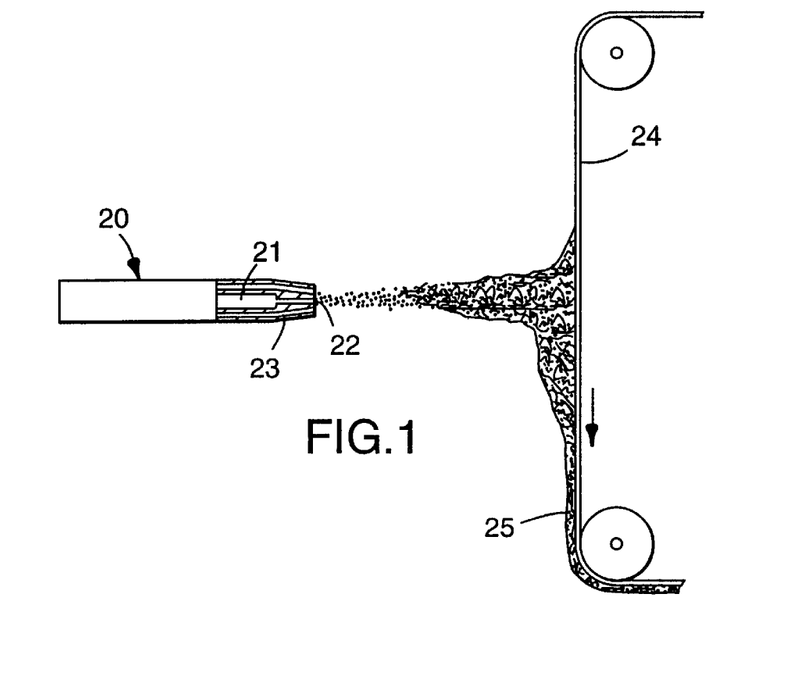
FIG. 1 is a side view of an apparatus useful in making the nonwoven microfiber web used in forming the filter medium web of the present invention.

Nonwoven microfiber webs useful in forming the present invention HEPA filter medium, may be prepared using an apparatus as shown in FIG. 1. Such an apparatus includes a die 20, which has an extrusion chamber 21 through which molten fiber-forming polymer or polymer blend is advanced. Die orifices 22 are arranged in line across the forward end of the die and through which the fiber-forming material is extruded; and cooperating gas orifices 23 through which a gas, typically heated air or steam, is forced at high velocity. The high velocity gaseous stream draws out and attenuates the extruded fiber-forming material, whereupon the fiber-forming material solidifies as microfibers and forms into a web 25 during travel to a collector 24. The formed web has a basis weight of less than 60 grams/m², preferably from about 15 to 50 grams/M², preferably from about 20 to 40 grams/m², and a pressure drop of less than 10 mm H₂O, preferably less than 6mm H₂O, most preferably less than 5mm H₂O, at a face velocity of 5.3 cm/sec.

Hydrocharging of the web is carried out by impinging jets of water or a stream of water droplets onto the web at a pressure sufficient to provide the web with a filtration enhancing electret charge. The pressure necessary to achieve optimum results will vary depending on the type of sprayer used, the type of polymer from which the web is formed, the type and concentration of additives to the polymer, the thickness and density of the web. Generally, pressures in the range of about 10 to 500 psi (69 to 3450 kPa) are suitable. Preferably the water used to provide the water droplets is relatively pure. Distilled or deionized water is preferable to tap water.

The jets of water or stream of water droplets can be provided by any suitable spray means. Apparatus useful for hydraulically entangling fibers are generally useful in the method of the present invention, although operation is carried out at lower pressures in hydrocharging than generally used in hydroentangling.

Figure 2:
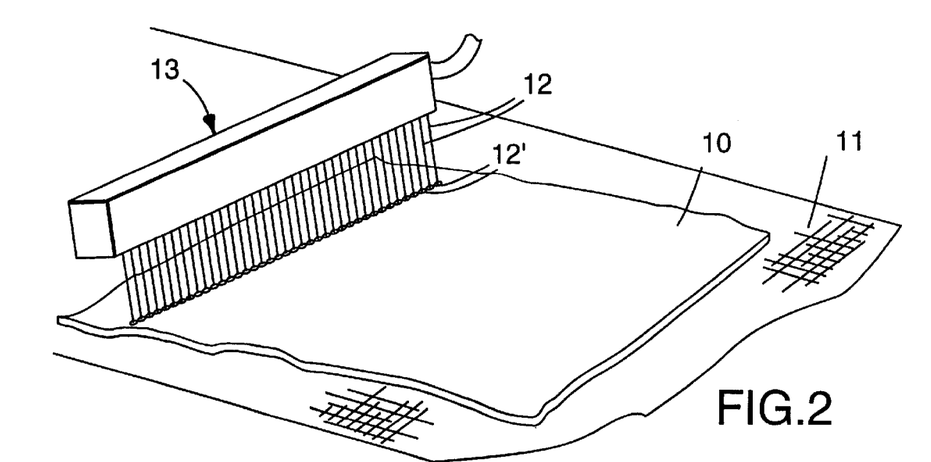
FIG. 2 is a perspective view of a water jet spray apparatus useful in forming the filter medium web of the present invention.

An example of a suitable spray means is shown in FIG. 2 where fibrous web 10 is transported on support means 11. The transport means may be in the form of a belt, preferably porous, such as a mesh screen or fabric. Orifices 12 in water jet head 13 provide the water spray, with a pump (not shown) providing the water pressure. Water jets 12 impinge on web 10 at impingement points 12'. Preferably, a vacuum is provided beneath a porous support to aid in passage of the spray through the web and to reduce drying energy requirements.

Figure 3:
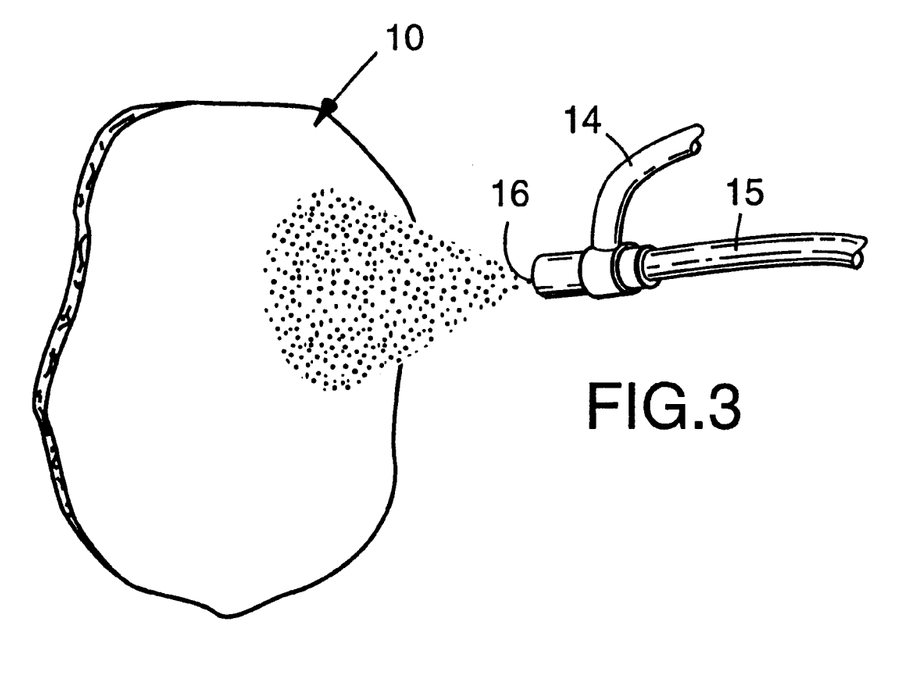
FIG. 3 is a perspective view of a nebulizer useful in forming the filter medium web of the present invention.

Further examples of spray means suitable for use in the method of the present invention include nebulizers such as that shown in FIG. 3 wherein water provided through water line 14 and pressurized air provided through air line 15 are supplied to a nozzle 16 to provide a spray mist to impact web 10 in addition to other known spray means.

The fibers can be a single layer or multiple layers or of a sheath-core configuration. If multiple layers are employed at least some of the outer layers or the sheath layer must contain the performance-enhancing additive as described in the blends discussed above. Preferably, the extruded fibers are in the form of microfibers having an effective diameter of less than 5 micrometers, preferably less than 4.5 as calculated according to the method set forth in Davies, C. N., "The Separation of Airborne Dust and Particulates,"Inst. of Mech. Eng., London, Proceedings 1B, 1952.

Electret articles of the invention can be characterized by TSDC studies. In TSDC a sample is placed between two electrodes, heated at a constant rate, and current discharged from the sample is measured by an ammeter. TSDC is a well known technique. See, for example, U.S. Pat. No. 5,256,176, Lavergne et al., "A Review of Thermo-Stimulated Current, "IEEE Electrical Insulation Magazine, vol. 9, no. 2, 5–21, 1993, and Chen et al., "Analysis of Thermally Stimulated Processes," Pergamon Press, 1981. The current discharged from the sample is a function of the polarizability and charge trapping of the article being tested. Charged articles can be tested directly. Alternatively, charged and uncharged articles can be first poled in an electric field at an elevated temperature and then rapidly cooled below the glass transition temperature ($T_g$) of the polymer with the polarizing field on to "freeze in" the induced polarization. The sample is then heated at a constant rate and the resulting discharged current in measured. In the polarization process, charge injection; dipole alignment, charge redistribution or some combination of these may occur. The charged web is characterized by having a charge level as measured by TSDC of at least 5 $\mu Cm^2$, preferably at least 6 $\mu C/m^2$.

During a thermally stimulated discharge, charges stored in an electret become mobile and are neutralized either at the electrodes or in the bulk sample by recombination with charges of opposite sign. This generates an external current that shows a number of peaks when recorded as a function of temperature which is plotted on a graph (termed a TSDC spectrum). The shape and location of these peaks depends on charge trapping energy levels and physical location of trapping sites.

As indicated by many researchers (see, for example, Sessler, ed., "Electrets," Springer-Verlag, 1987, and van Turnhout, "Thermally Stimulated Discharge of Polymer Electrets," Elsevier Scientific Publishing Co., 1975), electret charges are usually stored in structural anomalies, such as impurities, defects of the monomeric units, chain irregularities et cetera. The width of a TSDC peak is influenced by the distribution of charge trapping levels in the electrets. In semicrystalline polymers, often charges will either accumulate or be depleted near the amorphous-crystalline interfaces due to the difference in conductivity of the phases (the Maxwell-Wagner effect). These trapping sites are usually associated with different trapping energies where a continuous distribution of activation energies will be expected and the TSDC peaks expected to overlap and merge into a broad peak.

The material used to form the HEPA electret filter medium of the invention is desirably substantially free of materials such as antistatic agents that could increase electrical conductivity or otherwise interfere with the ability of the article to accept and hold electrostatic charge. Additionally, the electret filter medium should not be subjected to unnecessary treatments such as exposure to gamma rays, UV irradiation, pyrolysis, oxidation, etc., that might increase electrical conductivity. Thus, in a preferred embodiment the electret filter medium is made and used without being exposed to gamma irradiation or other ionizing irradiation.

A high efficiency filtration medium of the invention preferably comprises a filter web of electret charged fibers of polypropylene, poly(4-methyl-l-pentene) or blends thereof which have a basis weight (BW) of less than 60 grams/m², an effective fiber diameter (EFD) of less than 5 microns and a penetration (PEN) of less than 0.03%, wherein the ratio (I);

$$BW/(EFD \cdot PEN) \qquad \qquad I$$

is greater than 200, preferably greater than 400, most preferably greater than 1,000. The high efficiency filter web percent penetration(PEN) is preferably less than 0.02%, and most preferably less than 0.01%. Percent penetration is defined as particle concentration downstream versus particle concentration upstream for 0.3 micron DOP particles at a face velocity of 5.3 cm/sec. This high efficiency for the invention filter medium is obtained at relative low basis weights in comparison to commercially known HEPA level performing filter webs.

This high efficiency for the invention filter medium is obtained at relative low basis weights. The high efficiency filter medium basis weight is preferably less than 50 grams/m², and most preferably less than 40 grams/M², and even more preferably less than 30 grams/m². The thickness of the filter web is generally less than 0.15 cm, preferably less than 0.1 cm.

The combination of high efficiency, low basis weight and low pressure drop is not entirely understood, however, for webs of comparable charge levels relatively small changes in the effective fiber diameter can significantly reduce filtration performance below HEPA levels. The criticality of the relationship between charge level and fiber diameter can not be simply attributed to either enhancements in filtration performance due to either mechanical filtration effects or charge filtration effects or even an additive of these two effects. This can be seen in that as the EFD decreases the relative ratio of the penetration (inverse of efficiency) between the uncharged web and the charged web increases dramatically going from greater than 200 to greater than 5,000 or higher. Other preferred ranges for the penetration ratio include greater than 200 and greater than 10,000. This is primarily due to dramatic increases in the penetration of the larger EFD charged webs, or conversely the dramatic decreases in percent penetration for smaller EFD charged webs, having relatively the same charge level. However, there is relatively minor percent changes in the percent penetration of the corresponding uncharged versions of the same webs. As such the increases in performance for the invention webs can not be attributed to either the increased mechanical capture efficiencies with decreasing EFD's or due to charge level. It is believed that at certain fiber diameters and charge levels (as defined herein), the relative concentration of surface charges increases to a level that allows the charges to create enhanced field effects, which enables one to obtain HEPA level filtration performance with synthetic fiber thermoplastic webs at relatively very low basis weights. These basis weights are considerably less than conventional HEPA webs, for example, at basis weights of less than half that able to obtain HEPA level performance in the best known commercial synthetic fiber HEPA filter webs (generally 100 g/m² or higher).

The HEPA filtration medium of the invention can be easily corrugated into complex shapes, such as conventional zig-zag pleats with high pleat density due to its low basis weight and thickness, for example, up to 500 and preferably up to 300 pleats/meter. The invention web can be corrugated into pleated structures by standard pleating methods and equipment. This pleatability and handleablity is due to the relatively high strength of the invention melt formed thermoplastic fiber webs. Generally the invention nonwoven filter webs have a tensile strength sufficient to be self-supporting, which generally is a tensile strength in at least one direction of at least about 5 Newtons, preferable at least 10 Newtons, and is formed of a matrix of entangled microfibers that are bonded together at the fiber crossover points.

The invention filtration medium web can be used alone or it can be laminated to further functional layers by adhesives, heat bonding, ultrasonics or the like. These further functional layers can be prefilter layers, e.g. for large diameter particles; support layers such as scrims, spunbond, spun lace, melt blown, air laid nonwoven, wet laid nonwoven or glass fiber webs, netting such as Delnet, metal mesh or the like; absorbent filter medium; protective cover layers or any other functional layer or layers. Also multiple layers of the invention filter web can be laminated together to provide improved performance. For example, webs prepared in accordance with the invention which may have insufficient performance to be considered HEPA filter webs(e.g. those in the 20 grams/M² or less range) can be laminated together to obtain HEPA level performing filter webs. These laminated webs can exhibit higher efficiencies than those obtainable for comparable singe layer webs of the same basis weight. In this way, for example, a laminate of two 10 grams/m² webs may be HEPA level performance while an otherwise identical 20 grams/n² web is less than HEPA level performance.

EXAMPLES

Web Characterization Procedures

Web Thickness

Web thickness of all particulate medium was measured using an electronic digital caliper, Type IDF-150E, from Mitutoyo Corporation, Kawasaki, Japan.

Penetration and Pressure Drop

Penetration and pressure drop for individual BMF webs was determined by using AFT tester, Model 8110, from TSI Inc., St. Paul, Minn. which challenges a 100 cm² area sample of the web with 0.3 micron dioctyl phthalate (DOP) particles at a flow rate of 32 1/min. (face velocity of 5.3 cm/sec).

Effective Fiber Diameter (EFD)

The EFD of the BMF webs was determined according to the method set forth in Davies, C. N.: Proc. Inst. Mech. Engrs., London, 1B, p. 185, (1952).

Charge Density Measurement

Charge density for the webs of the invention was determined using a thermally stimulated charge (TSDC) current study procedure. Charge measurements were made with a SOLOMAT TSC/RMA Model 61000 Instrument (available from TherMold Partners, L. P., Thermal Analysis Instruments of Stanford, CT) for thermally stimulated current and relaxation map analysis. The charged web sample was poled by applying a DC field, E, of 4 kV/mm at 100 ° C. for 20 minutes and the web quenched to −50° C. while the field is still maintained. Following the poling, the sample was heated to 180° C. at a rate of 3° C./minute and the discharge current recorded as a function of temperature.

Web Preparation

Process A

A polypropylene based blown microfiber (BMF) web was prepared using a melt blowing process similar to that described, for example, in Wente, "Superfine Thermoplastic Fibers," in *Industrial Engineering Chemistry*, Vol. 48, pages 1342 et seq (1956) or in Report No. 4364 of the Naval Research Laboratories, published May 25, 1954, entitled "Manufacture of Superfine Organic Fibers" by Wente et al.. The extruder had four temperature control zones which were maintained at 210° C., 290° C., 340° C., and 340° C., the flow tube connecting the extruder to the die was maintained at 320° C., and the BMF die was maintained at 320° C.. The primary air was maintained at about 400° C. and 690 kilopascals (kPa) with a 0.102 cm gap width, to produce a uniform web. Polypropylene resin was delivered from the BMF die at a rate of 0.182 g/hole/min. and the resulting web collected on a perforated rotating drum collector positioned at the indicated collector/die distances in the following examples. The collector drum was connected to a vacuum system which could be optionally turned on or off while collecting the BMF web, thereby allowing a higher solidity web to be prepared when a vacuum was applied to the collector drum. A water mister was positioned intermediate of the BMF die and the collector drum to facilitate cooling the BMF web and increasing overall production rates. In all cases, lower basis weight BMF webs were obtained by increasing the rotational speed of the collector rather than reducing the resin delivery rate. Average effective fiber diameter (EFD) for the webs obtained from this process ranged between about 2 to about 7 microns. Actual EFD and web basis weight data is indicated for each example.

Process B

Process B was substantially the same as Process A except that a BMF die used in Process A was replaced with a die available from the J&M company (Dawsonville, Ga.) under the designation J&M MPMB Die (Melted Polymer Melt Blown Die).

Web Charging

Process I

BMF webs were charged using a hydro-charging process substantially as described in U.S. Pat. No. 5,496,507 (Angadjivand et al.) which is incorporated herein by reference, using a water pressure of about 550 kPa.

Process II

BMF webs were charged using a corona charging process using a drum charger substantially as described in U.S. Pat. No. 4,749,348 (Klaase et al.) which is incorporated herein by reference.

Polypropylene Resins

Escorene™-PP 3505

A 400 melt flow index polypropylene resin available from Exxon Corp., Houston, Tex.).

Escorene™-PP 3746

A 1400 melt flow index polypropylene resin available from Exxon Corp.

Fina 3860

A 100 melt flow index polypropylene resin available from Fina Corp., Houston, Tex.).

Fina 1500 MFI Polypropylene

A 1500 melt flow index polypropylene resin available from Fina Corporation under the designation EOD-97-18.

Charge Enhancement Package

A charge enhancement package was prepared by melt compounding CHIMASSORB™ 944FL (a hindered amine available from Ciba-Geigy Corp., Hawthorne, N.Y.) into poly(4-methyl-1-pentene) (TPX DX 820, available from Mitsui Petrochemical Industries, Tokyo, Japan) in a single screw extruder in a 40:60 ratio and extruding the resultant blend into a large diameter fiber. The fiber was subsequently ground into a powder (0.125 inch mesh) which was added to the polypropylene pellet feed during preparation of the BMF webs. The typical BMF web composition consisted of 98.3 wt. % polypropylene, 0.9 wt. % poly(4-methyl-1-pentene), and 0.8 wt. % CHIMASSORB™ 944FL Examples 1–30

The composition and production parameters associated with the preparation of the BMF webs of Examples 1–30 are summarized in Table 1 and web characterization and performance data for the webs are presented in Table 2. All examples incorporated a charge enhancement additive package consisting of CHIMASSORB™ 944FL that had been compounded with poly(4-methyl-l-pentene) and added to the Escorene™-PP 3505 polypropylene resin in the extrusion process. Additionally, samples of the charged webs produced in Examples 7, 9, 11, 17–22, 24, 26, 27, and 29 were discharged by immersion in DOP/isopropyl alcohol solution (1.0 vol. % DOP) for a period of approximately 5 minutes and air dried for approximately 30 minutes. The filtration performance of the discharged webs was subsequently tested under conditions identical to those used in testing the charged webs, the results of which are reported in Table 2.

TABLE 1

BMF Web Composition and Production Data

| Example | Resin | BMF Process | Vac. On/Off | Water On/Off | Coll. Dist. (cm) | Charge Process |
|---|---|---|---|---|---|---|
| 1 | 3505 | A | On | On | 12.7 | I |
| 2 | 3505 | A | On | On | 12.7 | I |
| 3 | 3505 | A | On | On | 12.7 | I |
| 4 | 3505 | A | On | On | 12.7 | I |
| 5 | 3505 | A | On | On | 12.7 | I |
| 6 | 3505 | A | On | On | 12.7 | I |
| 7 | 3505 | A | Off | On | 12.7 | I |
| 8 | 3505 | A | On | On | 12.7 | I |
| 9 | 3505 | A | On | On | 12.7 | I |
| 10 | 3505 | A | Off | On | 15.2 | I |
| 11 | 3505 | A | On | On | 15.2 | I |
| 12 | 3505 | A | On | On | 17.8 | I |
| 13 | 3505 | A | On | On | 17.8 | I |
| 14 | 3505 | A | On | On | 20.6 | I |
| 15 | 3505 | A | Off | On | 20.6 | I |
| 16 | 3505 | A | On | On | 20.6 | I |
| 17 | 3505 | A | On | Off | 22.8 | I |
| 18 | 3505 | A | On | On | 22.8 | I |
| 19 | 3505 | A | On | On | 22.8 | I |
| 20 | 3505 | A | On | Off | 25.4 | I |
| 21 | 3505 | A | On | On | 25.4 | I |

TABLE 1-continued

BMF Web Composition and Production Data

| Example | Resin | BMF Process | Vac. On/Off | Water On/Off | Coll. Dist. (cm) | Charge Process |
|---|---|---|---|---|---|---|
| 22 | 3505 | A | On | On | 25.4 | I |
| 23 | 3505 | A | On | On | 10.2 | I |
| 24 | 3505 | A | On | On | 12.7 | I |
| 25 | 3505 | A | On | On | 15.2 | I |
| 26 | 3505 | A | On | On | 17.8 | I |
| 27 | 3505 | A | On | On | 20.6 | I |
| 28 | 3505 | A | On | On | 22.8 | I |
| 29 | 3505 | A | On | On | 25.4 | I |
| 30 | 3505 | B | On | Off | 10.8 | I |
| 31 | 3505 | B | On | Off | 10.8 | I |

TABLE 2

BMF Web Properties

| Example # | Basis Wt. (g/m$^2$) | Thickness (cm) | Pen. (%) | Press. Drop (mmH$_2$O) | EFD (microns) | Basis Wt. Pen. × EFD | Pen$_{Unchgd}$/Pen$_{Chgd}$ | Charge Density ($\mu$C/m$^2$) |
|---|---|---|---|---|---|---|---|---|
| 1 | 100 | 0.142 | 0.001 | 13.80 | 3.82 | 26,178 | — | — |
| 2 | 90 | 0.114 | 0.001 | 13.50 | 3.79 | 23,746 | — | — |
| 3 | 80 | 0.104 | 0.001 | 11.70 | 3.81 | 20,997 | — | 8.18 |
| 4 | 70 | 0.087 | 0.001 | 10.60 | 3.80 | 18,421 | — | — |
| 5 | 60 | 0.077 | 0.001 | 9.20 | 3.73 | 16,086 | — | 7.47 |
| 6 | 50 | 0.066 | 0.009 | 7.90 | 3.66 | 1,518 | — | — |
| 7 | 40 | 0.068 | 0.003 | 4.80 | 3.86 | 3,454 | 19,033 | 5.78 |
| 8 | 40 | 0.052 | 0.001 | 6.50 | 3.62 | 11,050 | — | — |
| 9 | 40 | 0.051 | 0.001 | 5.80 | 3.86 | 10,363 | 52,600 | 6.21 |
| 10 | 40 | 0.085 | 0.009 | 5.00 | 4.33 | 1,026 | — | — |
| 11 | 40 | 0.045 | 0.014 | 3.90 | 4.88 | 585 | 4,529 | — |
| 12 | 40 | 0.058 | 0.007 | 4.13 | 4.40 | 1,299 | — | — |
| 13 | 40 | 0.091 | 0.008 | 3.70 | 4.11 | 1,217 | — | — |
| 14 | 40 | 0.068 | 0.004 | 4.00 | 4.27 | 2,342 | — | — |
| 15 | 40 | 0.111 | 0.010 | 3.20 | 4.20 | 952 | — | — |
| 16 | 40 | 0.068 | 0.012 | 3.63 | 4.48 | 744 | — | — |
| 17 | 40 | 0.070 | 0.001 | 4.50 | 4.00 | 10,000 | 55,800 | — |
| 18 | 40 | 0.109 | 0.022 | 3.10 | 4.29 | 424 | 2,836 | — |
| 19 | 40 | 0.075 | 0.012 | 3.47 | 4.47 | 746 | 4,367 | — |
| 20 | 40 | 0.087 | 0.003 | 4.20 | 3.90 | 3,419 | 17,567 | — |
| 21 | 40 | 0.080 | 0.018 | 3.17 | 4.60 | 483 | 3,256 | — |
| 22 | 40 | 0.132 | 0.027 | 3.50 | 3.84 | 386 | 2,378 | — |
| 23 | 30 | 0.038 | 0.001 | 5.90 | 3.31 | 9,063 | — | — |
| 24 | 30 | 0.038 | 0.003 | 4.70 | 3.71 | 2,694 | 19,833 | — |
| 25 | 30 | 0.041 | 0.003 | 4.60 | 3.68 | 2,717 | — | — |
| 26 | 30 | 0.060 | 0.003 | 4.80 | 3.23 | 3,096 | 19,433 | — |
| 27 | 30 | 0.057 | 0.004 | 4.20 | 3.50 | 2,143 | 11,550 | 5.25 |
| 28 | 30 | 0.070 | 0.010 | 3.70 | 3.54 | 847 | — | — |
| 29 | 30 | 0.079 | 0.008 | 3.50 | 3.53 | 1,062 | 7,888 | 5.21 |
| 30 | 30 | 0.040 | 0.001 | 9.70 | 2.90 | 10,345 | 27,600 | — |
| 31 | 20 | 0.028 | 0.002 | 8.10 | 2.70 | 3,704 | 32,500 | — |

Examination of the data in Tables 1 and 2 suggests that BMF webs capable of HEPA performance can be prepared from webs having an appropriate fiber size and charge levels. BMF webs having a basis weight of approximately 60 grams/m$^2$ or less having EFDs of less than about 5 microns, preferable less than about 4.5 microns, and more preferably less than about 4 microns exhibit capture efficiencies of 99.97% or greater for 0.3 micron or larger particles with a pressure drop of less than about 10 mm H$_2$O, preferably less than about 6 mm H$_2$O.

Comparative Examples C1–C6

The charged BMF webs of Comparative Examples C1 and C2 were prepared substantially the same as the web of Example 9, except that the EFDs for the webs were 5.80 and 6.57 microns respectively, the charged BMF web of Comparative Example C3 was prepared substantially the same as the web of Example 28, except that the EFD for the web was 5.32, the charged BMF web of Comparative Example C4 was prepared substantially the same as the web of Example 29, except that the EFD for the web was 5.47, and the charged web of Comparative Example C5 was prepared substantially the same as the web of Example 21 except that web was charged by a combination of charging methods I and II. Comparative Example C6 is a commercially available HEPA performance charged microfiber web which has a significantly higher basis weight, is substantially thicker, and exhibits a much higher pressure drop than the webs of the present invention. Web characterization and performance data for Comparative Examples C1–C6 are presented in Table 3.

TABLE 3

Properties Of Comparative Webs

| Example # | Basis Wt. (g/m$^2$) | Thickness (cm) | Pen. (%) | Press. Drop (mmH$_2$O) | EFD (microns) | Basis Wt. Pen. × EFD | Pen$_{Unchgd}$/ Pen$_{Chgd}$ | Charge Density ($\mu$C/m$^2$) |
|---|---|---|---|---|---|---|---|---|
| C1 | 40 | 0.0174 | 0.140 | 2.80 | 5.80 | 49.3 | — | — |
| C2 | 40 | 0.0154 | 1.086 | 2.37 | 6.57 | 5.6 | — | — |
| C3 | 40 | 0.0252 | 0.127 | 2.67 | 5.32 | 59.2 | — | — |
| C4 | 40 | 0.0250 | 0.149 | 2.53 | 5.47 | 49.1 | 438 | 6.5 |
| C5 | 40 | 0.0416 | 1.60 | 5.10 | 4.38 | 5.7 | — | 4.37 |
| C6 | 105 | 0.0711 | 0.005 | 21.10 | 4.19 | 995.3 | 2,880 | — |

The data in Table 3 shows that webs prepared under substantially identical conditions, but having larger EFDs than the webs of the present invention or charged by a combination of two charging processes, do not exhibit HEPA filtration capture efficiencies.

Examples 32–33

The charged BMF webs of Examples 32–33 were prepared substantially the same as the web of Example 9 except that the polypropylene resins indicated below were substituted for the ESCORENE™-PP 3505 polypropylene resin used in Example 9.

Example 32 used ESCORENE™-PP 3747 polypropylene resin; and

Example 33 used Fina 3860 polypropylene resin.

Web characterization and performance data for the webs of Examples 32–33 are presented in Table 4.

TABLE 4

Properties of Webs Based on Alternative Polypropylene Resins

| Example # | Basis Wt. (g/m$^2$) | Thickness (cm) | Pen. (%) | Press. Drop (mmH$_2$O) | EFD (microns) | Basis Wt. Pen. × EFD |
|---|---|---|---|---|---|---|
| 32 | 40 | 0.020 | 0.001 | 5.33 | 4.60 | 8,696 |
| 33 | 40 | 0.034 | 0.001 | 7.77 | 3.50 | 11,429 |

The data in Table 4 demonstrates that the HEPA performance charged microfiber webs of the present invention are not dependent on a single polypropylene resin.

Examples 34–46 and Comparative Examples C7–C17

The charged BMF webs of examples 34–45 and Comparative Examples C7–C17 were prepared substantially the same as the web of Example 9 except that the charge enhancement additive package was modified to produce the final web compositions indicated in Table 5. Example 46 used the organic triazine charge enhancement package as described in WO 97/07272 (Rousseau et al.), example 22. The web of example 46 was prepared by dry blending the ESCORENE™-PP .3505, TPX, and organic triazine to obtain a uniform mixture, which was fed into the extruder. This series of examples also examined the effectiveness of two different methods of charging the microfiber webs, which is also indicated in Table 5. Web characterization and performance data for the webs of Examples 34–46 and Comparative Examples C7–C17 are presented in Table 6.

TABLE 5

Charge Enhancement Formulation And Charging Method Summary

| Example # | Wt. % TPX | Wt. % 944 | Charging Method |
|---|---|---|---|
| C7 | 1.0 | 0 | I |
| C8 | 1.0 | 0 | II |
| C9 | 1.0 | 0 | I + II |
| 34 | 0 | 0.8 | I |
| C10 | 0 | 0.8 | II |
| C11 | 0 | 0.8 | I + II |
| 35 | 1.5 | 0.2 | I |
| C12 | 1.5 | 0.2 | II |
| C1 | 1.5 | 0.2 | I + II |
| 36 | 1.5 | 0.4 | I |
| C14 | 1.5 | 0.4 | II |
| C15 | 1.5 | 0.4 | I + II |
| 37 | 1.5 | 0.6 | I |
| C16 | 1.5 | 0.6 | II |
| C17 | 1.5 | 0.6 | I + II |
| 38 | 2.0 | 0.8 | I |
| 39 | 3.0 | 0.8 | I |
| 40 | 4.0 | 0.8 | I |
| 41 | 5.0 | 0.8 | I |
| 42 | 6.0 | 0.8 | I |
| 43 | 7.0 | 0.8 | I |
| 44 | 8.0 | 0.8 | I |
| 45 | 9.0 | 0.8 | I |
| 46 | 1.0 | 0.8* | I |

*Additive composition for Example 46 described above.

TABLE 6

Charge Enhancement Additive and Charging Method Studies

| Example # | Basis Wt. (g/m$^2$) | Thickness (cm) | Pen. (%) | Press. Drop (mmH$_2$O) | EFD (microns) | Basis Wt. (Pen. × EFD) | Charge Density ($\mu$C/m$^2$) |
|---|---|---|---|---|---|---|---|
| C7  | 40 | 0.0190 | 6.207 | 6.20 | 3.99 | 1.6   | 2.78 |
| C8  | 40 | 0.0205 | 3.110 | 5.70 | 3.86 | 3.3   | — |
| C9  | 40 | 0.0206 | 0.563 | 5.70 | 3.86 | 18.4  | — |
| 34  | 40 | 0.0180 | 0.003 | 6.40 | 3.78 | 1,724 | 6.13 |
| C10 | 40 | 0.0182 | 1.592 | 6.20 | 3.85 | 6.5   | — |
| C11 | 40 | 0.0175 | 1.160 | 5.97 | 3.96 | 8.7   | — |
| 35  | 40 | 0.0198 | 0.015 | 5.5  | 3.97 | 671   | — |
| C12 | 40 | 0.0200 | 1.563 | 4.9  | 4.20 | 6.1   | — |
| C13 | 40 | 0.0195 | 0.583 | 5.2  | 4.14 | 16.6  | — |
| 36  | 40 | 0.0193 | 0.010 | 5.2  | 4.10 | 976   | — |
| C14 | 40 | 0.0195 | 1.680 | 5.13 | 4.13 | 5.8   | — |
| C15 | 40 | 0.0193 | 1.010 | 5.23 | 4.11 | 9.6   | — |
| 37  | 40 | 0.0195 | 0.002 | 5.50 | 3.99 | 5,012 | — |
| C16 | 40 | 0.0210 | 2.10  | 4.67 | 4.24 | 4.5   | — |
| C17 | 40 | 0.0205 | 0.980 | 4.87 | 4.18 | 9.8   | — |
| 38  | 40 | 0.0200 | 0.003 | 5.5  | 3.97 | 3,358 | — |
| 39  | 40 | 0.0185 | 0.006 | 4.9  | 4.30 | 1,550 | — |
| 40  | 40 | 0.0185 | 0.006 | 5.2  | 4.17 | 1,599 | — |
| 41  | 40 | 0.0200 | 0.003 | 5.3  | 4.03 | 3,308 | — |
| 42  | 40 | 0.0200 | 0.009 | 4.7  | 4.28 | 1,038 | — |
| 43  | 40 | 0.0205 | 0.023 | 4.5  | 4.35 | 400   | — |
| 44  | 40 | 0.0205 | 0.002 | 5.1  | 4.08 | 4,902 | — |
| 45  | 40 | 0.0215 | 0.015 | 4.6  | 4.24 | 629   | — |
| 46  | 40 | 0.0430 | 0.005 | 6.5  | 5.17 | 1,547 | — |

The data in Table 6 clearly demonstrates the importance of the charge enhancement additive package and the charging method in producing the HEPA filtration efficiency webs of the present invention. The charge level realized by the hydro-charging process coupled with the presence of an appropriate charge enhancement additive are critical factors in producing thin, low basis weight BMF webs exhibiting low pressure drops, yet capable of producing HEPA filtration efficiencies. Example 46 indicates that HEPA level performance is obtainable with webs having an EFD of slightly above 5 microns which is believed to be due to a very high charge level. Attempts to charge BMF webs in a corona process were uniformly unsuccessful, as were attempts to combine corona and hydro-charging techniques to produce HEPA filtration efficiency webs. The data in Table 6 also shows that HEPA filtration efficiency webs can be prepared with the poly(4-methyl-1-pentene) content of the formulation ranging from 0.0 wt. % to at least 9.0 wt. % of the final web composition.

Example 47

A charged BMF web was prepared substantially the same as the web of Example 46 except that the charge enhancement additive consisted of the fluorochemical additive A described above (1.0 wt. %) and the organic triazine used in Example 46 (0.5 wt. %). The web was prepared by dry blending the organic triazine and Fina 1500 MFI polypropylene resin to obtain a uniform mixture which was fed into a first extruder. The fluorochemical additive A was fed into the throat of a twin screw extruder along with Fina 1500 MFI polypropylene resin to produce a melt stream that contained about 11 wt. % fluorochemical additive. The output of the twin screw extruder was pumped into the fourth zone of the first extruder at a rate so as to produce a final fluorochemical concentration of 1.0 wt. % in the BMF web. The thus produced BMF web, which had a basis weight of 20 g/m$^2$ and an EFD of 4.5 microns, was charged by charging process I. When exposed to a 0.3 micron DOP challenge as described above, the charged web exhibited a pressure drop of 3.1 mm H$_2$O and a penetration of 4.4. A sample of the web was also discharged, as described in Example 1, and exposed to the same DOP challenge. The Pen$_{Unchg}$/Pen$_{Chgd}$ ratio for this web was 101 and the ratio Basis Wt./(Pen×EFD) was 10.1. A two layer laminate of this web was subsequently exposed to the DOP challenge as was a discharged sample of the laminate. The charged laminate exhibited a Pen of 0.008 at a pressure drop of 6.1 mm H$_2$O, the Pen$_{Unchg}$/Pen$_{Chgd}$ ratio for the web was 1,100 and the ratio Basis Wt./(Pen X EFD) was 1,111.

We claim:

1. A high efficiency filtration medium comprising nonwoven filter web of electret charged fibers of a nonconductive thermoplastic resin, having a resistivity greater than 10$^{14}$ ohm-cm, which nonwoven filter web has a basis weight (BW) of less than 60 grams/m$^2$, an effective fiber diameter (EFD) of less than about 5 microns and a DOP penetration (PEN) of less than 0.03%, wherein the ratio;

BW/(EFD.PEN)

is greater than 200.

2. The high efficiency filtration medium of claim 1 wherein the filter web percent penetration is less than 0.02%.

3. The high efficiency filtration medium of claim 2 wherein the filter web EFD is less than 4.0 microns.

4. The high efficiency filtration medium of claim 2 wherein the filtration medium comprises a further filtration layer.

5. The high efficiency filtration medium of claim 4 wherein the filtration medium is pleated.

6. The high efficiency filtration medium of claim 1 wherein the filter web percent penetration is less than 0.01%.

7. The high efficiency filtration medium of claim 1 wherein the filter web fibers are formed from a nonconductive polyolefin resin or blend.

8. The high efficiency filtration medium of claim 1 wherein the filter web basis weight is less than 50 grams/m$^2$.

9. The high efficiency filtration medium of claim 1 wherein the filter web is formed of charged fibers of polypropylene, poly (4-methyl-1-pentene) or blends thereof.

10. The high efficiency filtration medium of claim 1 wherein the filter web EFD is less than 4.5 microns.

11. The high efficiency filtration medium of claim 1 wherein the filter web ratio is greater than 400.

12. The high efficiency filtration medium of claim 1 wherein the filter web ratio is greater than 1,000.

13. The high efficiency filtration medium of claim 1 wherein the penetration ratio of the electret charged medium to the corresponding discharged medium is greater than 2,000.

14. The high efficiency filtration medium of claim 1 wherein the penetration ratio of the electret discharged medium to the corresponding charged medium is greater than 5,000.

15. The high efficiency filtration medium of claim 1 wherein the penetration ratio of the electret discharged medium to the corresponding charged medium is greater than 10,000.

16. The high efficiency filtration medium of claim 1 wherein the nonwoven filter web comprises a web of melt blown fibers.

17. The high efficiency filtration medium of claim 1 wherein the charged fibers of the nonwoven filter web have a charge enhancing additive.

18. The high efficiency filtration medium of claim 17 wherein the charge enhancing additive comprises a thermally stable organic compound or oligomer containing at least one perfluorinated moiety and/or thermally stable organic triazine compounds or oligomers containing at least one nitrogen atom in addition to those of the triazine group.

19. The high efficiency filtration medium of claim 1 wherein the charged fibers of the nonwoven filter web have a charge enhancing additive at a weight percent of 0.2 to 10 percent of the charged fibers.

20. The high efficiency filtration medium of claim 1 herein the charge enhancing additive comprises a hindered amine.

21. The high efficiency filtration medium of claim 1 wherein the filter web has a thickness of less than 0.15 cm.

22. The high efficiency filtration medium of claim 1 wherein the filter web has a thickness of less than 0.10 cm.

23. The high efficiency filtration medium of claim 1 wherein the filter web has a pressure drop of less than 10 mm H$_2$O.

24. The high efficiency filtration medium of claim 1 wherein the filter web has a pressure drop of less than 6 mm H$_2$O.

25. The high efficiency filtration medium of claim 1 wherein the filter web has a charge level of at least 5 $\mu$C/m$^2$.

26. The high efficiency filtration medium of claim 1 wherein the filter web has a charge level of at least 6 $\mu$C/m$^2$.

27. The high efficiency filtration medium of claim 1 wherein the filtration medium further comprises a support web.

28. The high efficiency filtration medium of claim 27 wherein the filter medium support web is attached to at least one face of the nonwoven filter web.

* * * * *

UNITED STATES PATENT AND TRADEMARK OFFICE
CERTIFICATE OF CORRECTION

PATENT NO.    : 6,123,752  
DATED         : September 26, 2000  
INVENTOR(S)   : Wu, Tien Page 1 of 1

It is certified that error appears in the above-identified patent and that said Letters Patent is hereby corrected as shown below:

Column 1,  
Line 41, delete the number "5" following "pressure" and preceding "drops".

Column 3,  
Line 3, delete the word "THE" following "OF".

Column 4,  
Line 5, delete "application Ser. No. 08/514,866" and insert in place thereof -- Patent No. 5,908,598 --.

Column 5,  
Line 46, delete "mnd." and insert in place thereof -- Ind. --.

Column 7,  
Lines 61-62, delete "Current, "IEEE" and insert in place thereof -- Current," IEEE --.

Column 9,  
Line 7, delete "grams/$M^2$" and insert in place thereof -- grams/$m^2$ --.

Column 10,  
Line 12, delete "grams/$M^2$" and insert in place thereof -- grams/$m^2$ --.  
Line 18, delete "grams/$n^2$" and insert in place thereof -- grams/$m^2$ --.

Column 16,  
Line 20, delete ".3505," and insert in place thereof -- 3505, --.

Signed and Sealed this

Twenty-sixth Day of November, 2002

Attest:

Attesting Officer

JAMES E. ROGAN  
Director of the United States Patent and Trademark Office